United States Patent
Murdock

[19]

[11] Patent Number: 6,015,126

[45] Date of Patent: Jan. 18, 2000

[54] TRIANGULAR SNAP-IN MOUNT

[75] Inventor: Jay A. Murdock, Southgate, Mich.

[73] Assignee: Lear Automotive Dearborn, Inc., Southfield, Mich.

[21] Appl. No.: 09/088,608

[22] Filed: Jun. 1, 1998

[51] Int. Cl.[7] ..................................................... A47F 5/00
[52] U.S. Cl. .................................. 248/289.11; 248/224.8; 248/231.9; 248/291.1; 246/97.11; 246/97.9; 246/214
[58] Field of Search ........................... 248/289.11, 291.1, 248/71, 224.8, 231.9, 27.1; 296/97.11, 214

[56] References Cited

U.S. PATENT DOCUMENTS

| | | |
|---|---|---|
| 2,687,862 | 8/1954 | Crowther . |
| 2,884,283 | 4/1959 | Korol et al. . |
| 4,529,157 | 7/1985 | Suman et al. . |
| 4,569,552 | 2/1986 | Marks . |
| 4,729,590 | 3/1988 | Adams . |
| 4,844,533 | 7/1989 | Dowd et al. . |
| 4,893,866 | 1/1990 | Dowd et al. . |
| 4,893,867 | 1/1990 | Hilborn et al. . |
| 4,902,068 | 2/1990 | Dowd et al. . |
| 4,913,484 | 4/1990 | Dowd et al. . |
| 4,989,911 | 2/1991 | Van Order . |
| 5,031,953 | 7/1991 | Miller ....................................... 296/97.9 |
| 5,056,853 | 10/1991 | Van Order . |
| 5,061,005 | 10/1991 | Van Order et al. . |
| 5,186,517 | 2/1993 | Gilmore et al. .......................... 296/214 |
| 5,201,564 | 4/1993 | Price ....................................... 296/97.9 |
| 5,236,240 | 8/1993 | Burns et al. ............................. 296/97.9 |
| 5,314,227 | 5/1994 | Weiland et al. .......................... 296/97.9 |
| 5,496,006 | 3/1996 | Kulka et al. ............................ 248/231.9 |
| 5,636,891 | 6/1997 | Van Order et al. ...................... 296/37.7 |
| 5,662,375 | 9/1997 | Adams et al. ............................ 296/214 |
| 5,857,728 | 1/1999 | Crotty, III .............................. 296/97.9 |
| 5,876,084 | 3/1999 | Smith et al. ............................. 296/214 |

FOREIGN PATENT DOCUMENTS 2341940   6/1978   Germany .

OTHER PUBLICATIONS

"Snap–In Mount" U.S. Patent Application filed Jun. 1, 1998 (inv. Murdock)

Primary Examiner—Ramon O Ramirez
Assistant Examiner—Debbie D. Short
Attorney, Agent, or Firm—MacMillan, Sobanski & Todd, LLC

[57] ABSTRACT

A sun visor includes a visor body attached to a pivot rod. The sun visor is pivotally mounted to a vehicle roof and/or headliner by using a visor mount assembly. The visor mount assembly includes a mounting bracket, attached to the pivot rod, and a mount for securing the rod and the mounting bracket to the roof or other mounting surface. The mount includes a multi-sided base that is spaced above the mounting surface. The base is substantially triangular in shape with three sides. Each side has a first leg, a second leg, and a third leg attached to the base in a cantilevered fashion. The first and second legs flex inwardly as the mount is inserted through a mounting hole in the roof. The third legs include a flat tab extension which forms a mounting point for attachment of the mount to the headliner and mounting bracket. Ultimately, the roof is gripped between the first and second legs of the mount when the sun visor mounted onto the vehicle roof. The triangular shape of the mount prevents rotation from occurring between the mount and the roof.

20 Claims, 2 Drawing Sheets

TRIANGULAR SNAP-IN MOUNT

BACKGROUND OF THE INVENTION

This application relates to a unique mounting apparatus for securing automobile components, such as a sun visor pivot rod to a vehicle roof.

When driving a vehicle it is desirable to shield an occupant's eyes from glaring sunlight which enters the vehicle interior through the windshield or the side windows. As a result, the interior of vehicles is usually equipped with sun visors.

Visors typically include a visor body and a pivot rod assembly. The pivot rod assembly includes a L-shaped pivot rod, a torque control and a means for mounting the rod to the vehicle roof and/or headliner. The torque control rotationally mounts the visor body to the pivot rod, and allows the visor body to be moved between, and held at, various rotational positions with respect to the rod. This allows the visor to be moved between a lowered position adjacent the windshield or side window to a raised position adjacent the roof and/or headliner.

Since the sun may enter the windshield or side window the rod mount should allow the visor to be pivoted between the windshield and the side window in the lowered position. A number of methods have been proposed for mounting the pivot rods to the roof and/or headliner. One known way is the snap-in type of mount. This type of mount is the easiest and quickest to install, since it is simply snap-fit within a hole in the roof and/or headliner, usually with the pivot rod attached prior to installation. This type of mount is also inexpensive to manufacture.

Sometimes the current snap-in mounts may rotate in the mounting hole after the sun visor rod and mount are snapped into place, which is undesirable. Additionally, sun visor and mounts can be complex and sometimes difficult to install. Therefore it is desirable to have an anti-rotation snap-in mount for improved stability and robustness that is easy to assemble onto a pivot rod assembly and install on a vehicle.

SUMMARY OF THE INVENTION

A sun visor includes a visor body attached to a pivot rod. The sun visor is pivotally mounted to a vehicle roof and/or headliner by using a visor mount assembly. The visor mount assembly includes a mounting bracket and a mount that snaps into the vehicle roof. In a disclosed embodiment of this invention, the mount includes a multi-sided base with a resilient first leg and a resilient second leg extending outwardly from each of the sides of the base. The first leg is spaced apart from the second leg along each side and the mounting surface is located between the first and second legs when the visor or other component is secured to the roof surface.

In a preferred embodiment of this invention, the mount includes a substantially triangular base that is spaced above the mounting surface and which has three sides. Each side has a first leg, a second leg, and a third leg attached to the base in a cantilevered fashion. The first and second legs flex inwardly as the mount is inserted through a mounting hole in the roof. The third legs include a flat tab extension which forms a mounting point for attachment of the mount to a vehicle headliner or other mounting surface and a mounting bracket. Ultimately, the mounting surface is gripped between the first and second legs of the mount when the sun visor mounted onto the vehicle roof. The triangular shape of the mount prevents rotation from occurring between the mount and the roof.

The subject invention offers several advantages over prior art systems because it provides a snap-in mount with improved stability and robustness that is easy to assemble and install on a vehicle and which prevents rotation between the mount and the roof after installation.

These and other features of the present invention will be best understood from the following specification and drawings, the following of which is a brief description.

DETAILED DESCRIPTION OF THE PREFERRED EMBODIMENT

Figure 1:
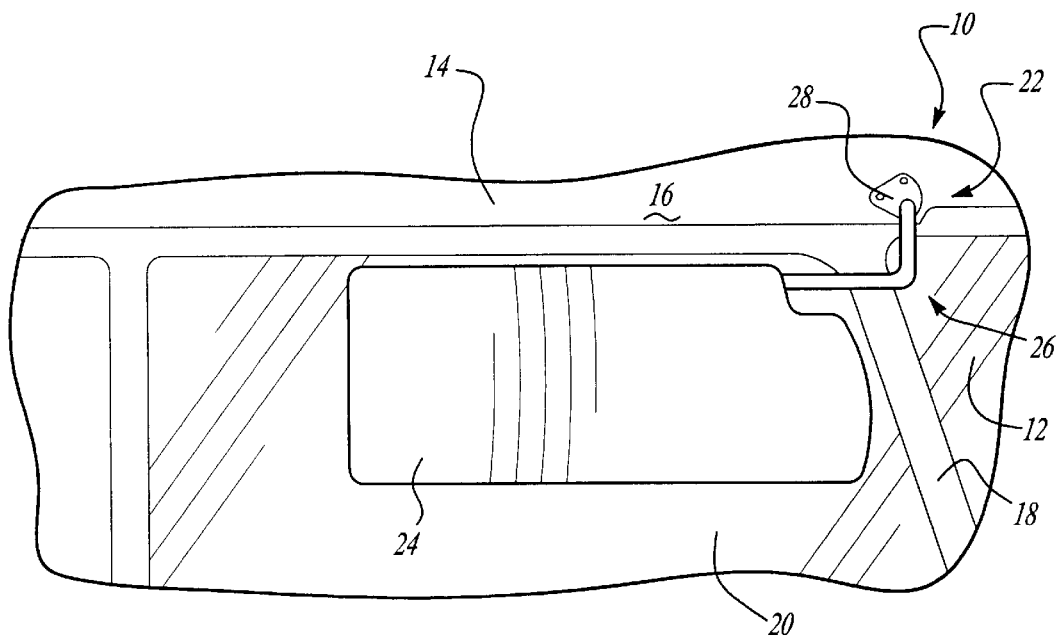
FIG. 1 is a fragmentary perspective view of a sun visor assembly as installed in a vehicle.
Figure 2:
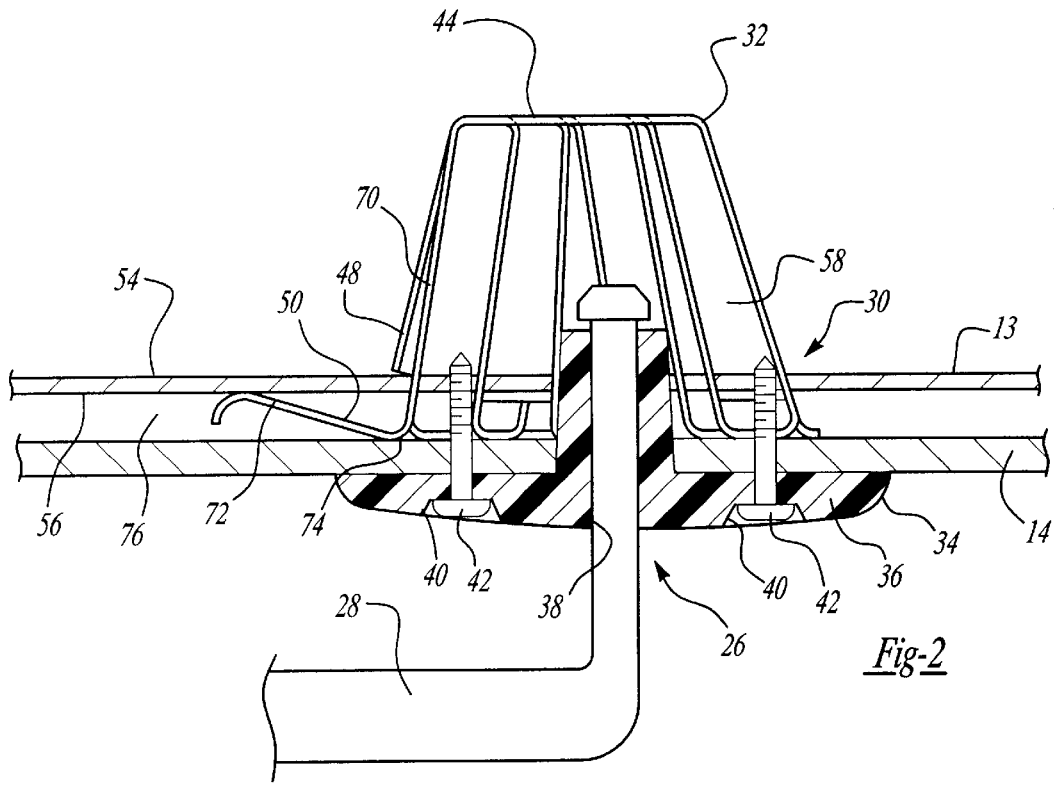
FIG. 2 is a fragmentary perspective view of the sun visor assembly including a mount of the present invention.

Referring to FIG. 1, a vehicle 10 includes a windshield 12 and a roof 13 (as shown in FIG. 2). The roof 13 provides structural support for the vehicle interior, and is usually comprised of a layer of sheet metal covered by a headliner 14 with an upholstered surface 16 to provide a trim appearance to the vehicle.

The vehicle further includes an A-pillar 18 separating the windshield 12 and a side window 20. A sun visor assembly 22 is shown on the driver's side of the vehicle.

The sun visor assembly 22 includes a visor body 24 and a pivot rod assembly 26. The visor body 24 is substantially rectangular and includes a channel (not shown). The channel longitudinally extends along a portion of the top edge of the visor body 24. When cloth or the like is wrapped around the visor body 24 the channel is enclosed.

Referring to FIG. 2, the pivot rod assembly 26 mounts the visor body 24 to a mounting surface, such as the vehicle roof 13. The pivot rod assembly 26 includes a torque control (not shown), a L-shaped pivot rod 28, and a visor mount assembly 30.

The torque control (not shown) rotationally mounts the visor body 24 to the rod 28, and rests within the visor body channel. The torque control used is conventional, and allows the visor body 24 to be moved between and held at various rotational positions with respect to the rod 28. This allows the visor body 24 to be moved between a lowered position adjacent the windshield 12 or side window 20 to a raised position adjacent the roof 13 and/or headliner 14.

The visor mount assembly 30 includes a mount 32 and a mounting bracket 34, shown in FIG. 2. The mounting bracket 34 is of generally conventional design, and preferably includes a body 36, a central mounting hole 38 for receiving the rod 28, and a plurality of fastener apertures 40 for receiving fasteners 42 for connection to the mount 32 and/or headliner 14. In another embodiment the rod 28 and the bracket 34 could attach using a snap-fit or other similar design. The rod 28 extends upwardly through the central mounting hole 38 and is typically secured in tension utilizing a compression spring and locking nut (not shown) in a conventional manner. The rod 28 is therefore pivotable with respect to the bracket 34.

Referring to FIG. 2, the mount 32 secures the bracket 34 and rod 28 subassembly to the vehicle roof 13 or other mounting surface. The mount 32 includes a polygonal base 44 having a plurality of sides 46 (see FIG. 3). A first leg 48 and a second leg 50 extend outwardly from each of the sides 46 of the base 44 in a cantilevered fashion. The first leg 48 is spaced apart from the second leg 50 with the roof mounting surface 13 being located between the first 48 and second 50 legs when the visor mount assembly 30 is secured to the roof mounting surface 13.

The first 48 and second 50 legs are preferably resilient spring-like members that flex inwardly as the mount 32 is inserted through an aperture 52 in the mounting surface 13. Once the mount 32 is installed into the vehicle roof 13, the first legs 48 exert a first force on one face 54 of the roof 13 and the second legs 50 exert a second force on an opposite face 56 of the roof 13. In the preferred embodiment, the face 54 of the roof 13 is the top face 54 of the roof 13 and the opposite face 56 is the bottom face 56 of the roof 13. The flexibility of the second leg 50 allows the mount 32 to accommodate various sheet metal thicknesses and or material or machining imperfections in the roof 13 near the mounting aperture 52.

Preferably, the base 44 is generally triangular shaped with three sides 46. One first leg 48 and one second leg 50 extend downwardly from each side 46 of the base 44 forming a pyramid-like structure. The mount 32 also includes a third leg 58 that extends downwardly from each side 46 of the base 44 in a cantilevered manner. Thus, in the preferred embodiment there are a total of nine (9) legs extending downwardly from the base 44 of the mount 32, i.e., there are three (3) first legs 48, three (3) second legs 50, and three (3) third legs 58.

The first 48, second 50, and third 58 legs each have a distal end 60. The distal ends 60 of the first legs 48 engage the top face 54 of the roof 13 while the distal ends 60 of the second legs 50 engage the bottom face 56 of the roof 13. The distal ends 60 of the third legs 58 have a tab extension 62 that is preferably parallel to the roof 13. The tab extensions 62 on each of the third legs 58 extend inwardly toward a center 64 of the base 44 and are generally flat. Each tab extension 62 forms a mounting point for attachment to the mounting bracket 34 and/or headliner 14. In another embodiment, the tab extensions 62 could extend outwardly away from the center 64 of the base 44.

The distal ends 60 of the third legs 58 have apertures 66 for receiving fasteners 42. The fasteners 42 are preferably screws, but other conventional fasteners or fastening methods could be used. The fasteners 42 extend through the fastener apertures 40 in the mounting bracket 34, through the head liner 14, and through the tab extensions 62 of the mount 32.

The distal ends 60 of the first 48, second 50, and third 58 legs extend downwardly and outwardly away from the center 64 of the base 44 such that the first 48, second 50, and third 58 legs are orientated at angles with respect to the base 44. This means that the mount 32 is narrower at the base 44 than at the distal ends 60 of the legs 48, 50, 58 thus, providing a lead-in as the mount 32 is inserted into the aperture 52 in the roof 13. This facilitates the installation of the mount 32 into the roof 13.

Figure 3:
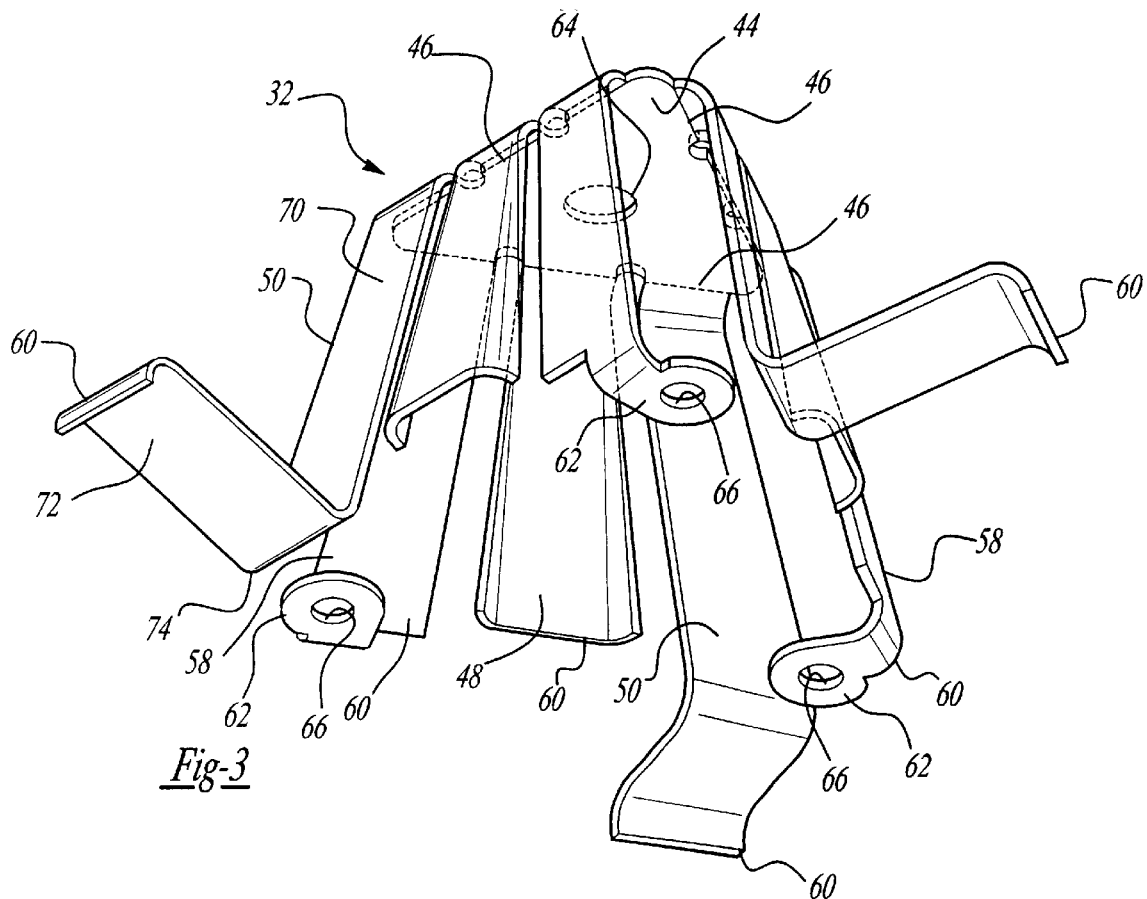
FIG. 3 is an enlarged, perspective, exploded view of a mount of the present invention.
Figure 4:
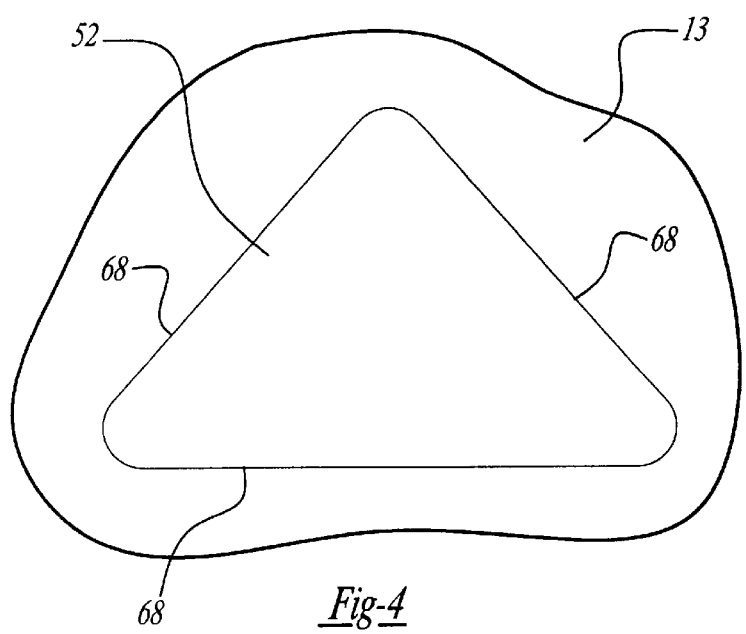

The aperture 52 in the roof 13 is preferably defined by a plurality of sides 68 corresponding in number to the number of sides 46 of the base 44. Thus, as shown in FIG. 3, when the mount 32 is triangular shaped with three (3) sides 46, the aperture 52 also has three (3) sides 68. When the mount 32 is inserted through the aperture 52 the sides 46 of the base 44 are aligned with the sides 68 of the aperture 52 so that there is no relative rotational movement between the mount 32 and the roof 13. This means that once the mount 32 is installed in the roof 13, it will not inadvertently rotate out of alignment. The multi-sided base 44 in combination with the first 48 and second 50 legs forcefully engaging opposing sides of the roof 13 provide a very stable mount 32 for receiving a sun visor assembly 22.

Preferably, the second legs 50 are generally L-shaped and include a first portion 70 connected to a second portion 72 at an elbow 74. The first portion 70 extends outwardly and downwardly from the base 44 to the elbow 74 and the second portion 72 extends upwardly and outwardly from the elbow 74. The first portion 70 extends through the roof, i.e., is both above and below the roof 13, while the second portion 72 is located entirely underneath the roof 13.

The second portion 72 is preferably located at an angle with respect to the first portion 70 of the second leg 50 and is also located at an angle with respect to the mounting component, i.e., the body 36 of the mounting bracket 34. Thus, the second leg 50 is capable of engaging the roof 13 and the mounting bracket 34 simultaneously. In the preferred embodiment, the second leg 50 simultaneously engages the roof 13 and the headliner 14 which is located between the mounting bracket 34 and the roof 13. The second leg 50 engages mounting bracket 34 or headliner 14 near or at the elbow 74 while the distal end 60 of the second portion 74 engages the roof 13.

Because of the orientation of the second leg 50 a gap 76 is created between the roof 13 and the headliner 14 and/or mounting bracket 34 as shown in FIG. 2. The resiliency of the second leg 50 allows the mount 32 to accommodate various thicknesses of the roof sheet metal 13 and/or the headliner 14 while still providing a stable mount 32. Once the mount 32 is assembled into the roof 13, the first leg 48 is located entirely above the roof while the second 50 and third 58 legs are located both above and below the roof 13. The first portion 70 of the second leg is partially above and below the roof, but the elbow 74 and the second porion 72 of the second leg 50 are both located entirely below the roof 13.

The principal advantage of the present invention is that the snap-in type mount 32 provides a simple design which is easy to assemble to the rod subassembly 26 and install in the vehicle 10 and which prevents rotation between the mount 32 and the vehicle roof 13 or other mounting surface.

While a particular invention has been described with reference to the illustrated embodiment, various modifications of the illustrative embodiment will be apparent to persons skilled in the art upon reference to this description without departing from the spirit and scope of the invention. These modifications include, but are not limited to, modifying the shape of the mount 32, including modifying the shape of the base 44, the tab extensions 62, or the first 48, second 50, and third 58 legs. Furthermore, the mount 32 can be used with a headliner 14 that is already attached to the roof 13 and the second legs 58 can engage the lower side of the headliner 14 and the first legs 48 can engage the upper side of the headliner 14. In addition, the mount can be used to secure other interior components in a vehicle, for example it can be used with door panels. It is therefore contemplated that the appended claims will cover any such modification or embodiments that fall within the true scope of the invention.

Preferred embodiments of this invention have been disclosed, however, a worker of ordinary skill in the art would recognize that certain modifications would come within the scope of this invention. For that reason, the following claims should be studied to determine the true scope and content of this invention.

I claim:

1. A mount for securing a component to a mounting surface, said mount comprising:
   a polygonal base having a plurality of sides;
   a resilient first leg extending outwardly from each of said sides of said base; and
   a resilient second leg extending outwardly from each of said sides of said base with said first leg being spaced apart from said second leg, said second leg including a first portion connected to a second portion at an elbow, said first portion extending outwardly and downwardly from said base to said elbow, and said second portion extending upwardly and outwardly from said elbow so that said second leg is capable of engaging the mounting surface and a surface of the component simultaneously.

2. A mount as recited in claim 1 wherein the mounting surface has an aperture defined by a plurality of sides corresponding in number to said plurality of sides of said base such that when the mount is inserted through the aperture there is no relative rotational movement between the mount and the mounting surface.

3. A mount as recited in claim 1 wherein said first and second legs flex inwardly as said mount is inserted through an aperture in the mounting surface such that said first leg exerts a first force on one face of the mounting surface and said second leg exerts a second force on an opposite face of the mounting surface after full insertion of said mount into the aperture.

4. A mount as recited in claim 1 including a third leg extending outwardly from each of said sides of said base and being spaced apart from said first and second legs.

5. A mount as recited in claim 4 wherein said third leg is cantilevered with a distal end having a tab extension generally parallel to the mounting surface, said tab extension forming a mounting point for attachment to the component.

6. A mount as recited in claim 4 wherein said base has a center and said first, second, and third legs are cantilevered with distal ends extending downwardly and outwardly away from said center such that said first, second, and third legs are orientated at angles with respect to said base.

7. A mount as recited in claim 1 wherein said base is substantially triangular such that said plurality of sides is three sides.

8. A mount as recited in claim 1 wherein said second leg engages the surface of the component adjacent to said elbow while a distal end of said second portion engages the mounting surface.

9. A visor mount assembly for mounting a visor to a vehicle roof comprising:
   a mounting bracket connect to said visor; and
   a mount for receiving said mounting bracket, said mount including a polygonal base spaced apart from the mounting surface and having a plurality of sides, a first leg extending outwardly from each of said sides of said base, and a second leg extending outwardly from each of said sides of said base, said first and second legs extending from said base in a cantilevered fashion from each of said sides of said base.

10. A visor mount assembly as recited in claim 9 wherein said base is substantially triangular such that said plurality of sides.

11. A visor mount assembly as recited in claim 10 wherein said first and second legs flex inwardly as said mount is inserted through a generally triangular aperture in the roof.

12. A visor mount assembly as recited in claim 11 wherein said first legs exert a first force on one face of the roof and said second legs exert a second force on an opposite face of the roof upon insertion of said mount into the triangular aperture such that there is no relative rotational movement between said mount and the roof.

13. A visor mount assembly as recited in claim 10 including a third leg extending outwardly from each of said sides of said base, said third leg having a cantilevered attachment to said base with a distal end having a tab extension generally parallel to the roof, said tab extension forming a mounting point for attachment to said mounting bracket.

14. A visor mount assembly as recited in claim 13 wherein said base has a center and said first, second, and third legs extend downwardly and outwardly away from said center such that said first, second, and third legs are orientated at angles with respect to said base.

15. A mount as recited in claim 1 wherein the mounting surface is located between said first and second legs when the component is secured to the mounting surface.

16. A visor mount assembly as recited in claim 9 wherein the mounting surface of the vehicle roof is located between said first and second legs when the visor is secured to the mounting surface.

17. A mount for securing a component to a mounting surface, said mount comprising:
   a polygonal base having a plurality of sides;
   a first leg extending outwardly from each of said sides of said base;
   a second leg extending outwardly from each of said sides of said base, said second leg including a first portion connected to a second portion, said first portion extending outwardly and downwardly from said base to said second portion, said second portion extending upwardly and outwardly from said first portion; and
   a third leg extending outwardly from each of said sides of said base.

18. A mount as recited in claim 17 wherein said first, second, and third legs are cantilevered so that said first, second, and third legs are orientated at angles with respect to said base.

19. A mount as recited in claim 17 wherein said first and second legs flex inwardly as said mount is inserted through an aperture in the mounting surface such that said first leg exerts a first force on one face of the mounting surface and said second leg exerts a second force on an opposite face of the mounting surface when said mount is inserted into the aperture.

20. A mount as recited in claim 17 wherein said third leg includes a distal end with a tab extension forming a mounting point for attachment to said mounting surface.

* * * * *

UNITED STATES PATENT AND TRADEMARK OFFICE
CERTIFICATE OF CORRECTION

PATENT NO. : 6,015,126
DATED : January 18, 2000
INVENTOR(S) : Murdock

It is certified that error appears in the above-identified patent and that said Letters Patent is hereby corrected as shown below:

<u>IN THE CLAIMS</u>

Column 6, Claim 10, Line 3      after "sides", insert --is three sides--.

Signed and Sealed this

Third Day of April, 2001

*Attest:*

NICHOLAS P. GODICI

*Attesting Officer*     *Acting Director of the United States Patent and Trademark Office*